US009805246B2

(12) United States Patent
Wang (10) Patent No.: US 9,805,246 B2
(45) Date of Patent: Oct. 31, 2017

(54) METHOD AND SYSTEM FOR ENHANCING RIDGES OF FINGERPRINT IMAGES

(71) Applicant: National Kaohsiung University of Applied Sciences, Kaohsiung (TW)

(72) Inventor: Jing-Wein Wang, Kaohsiung (TW)

(73) Assignee: National Kaohsiung University of Applied Sciences, Kaohsiung (TW)

( * ) Notice: Subject to any disclaimer, the term of this patent is extended or adjusted under 35 U.S.C. 154(b) by 50 days.

(21) Appl. No.: 14/941,763

(22) Filed: Nov. 16, 2015

(65) Prior Publication Data

US 2016/0275652 A1 Sep. 22, 2016

(30) Foreign Application Priority Data

Mar. 17, 2015 (TW) .............................. 104108500 A (51) Int. Cl.
- *G06K 9/00* (2006.01)
- *G06T 5/00* (2006.01)
- *G06T 5/10* (2006.01)

(52) U.S. Cl.
CPC ....... *G06K 9/0008* (2013.01); *G06K 9/00013* (2013.01); *G06K 9/00067* (2013.01); *G06T 5/003* (2013.01); *G06T 5/10* (2013.01); *G06T 2207/20064* (2013.01)

(58) Field of Classification Search
CPC . G06T 2207/20064; G06T 5/003; G06T 5/10; G06K 9/00013; G06K 9/0008; G06K 9/00067
USPC .......................................................... 382/124
See application file for complete search history.

(56) References Cited

U.S. PATENT DOCUMENTS

| | | | | |
|---|---|---|---|---|
| 7,260,261 B2* | 8/2007 | Xie | ...................... | G06K 9/3233 382/173 |
| 7,899,217 B2* | 3/2011 | Uludag | .............. | G06K 9/00046 340/5.53 |
| 8,232,866 B2* | 7/2012 | McGrath | ............ | G07C 9/00158 340/5.1 |
| 8,942,430 B2* | 1/2015 | Ivanov | ............... | G06K 9/00006 382/115 |
| 2006/0104484 A1* | 5/2006 | Bolle | ................. | G06K 9/00885 382/115 |

(Continued)

FOREIGN PATENT DOCUMENTS

| TW | 354397 | 3/1999 |
|---|---|---|
| TW | 200641700 | 12/2006 |

*Primary Examiner* — Kanjibhai Patel
(74) *Attorney, Agent, or Firm* — Alan D. Kamrath; Kamrath IP Lawfirm, P.A.

(57) ABSTRACT

A fingerprint processing system includes an input unit, a calculation unit and an output unit. The input unit is applied to input an original fingerprint image. The calculation unit is applied to decompose the original fingerprint image to a decomposed image by singular value decomposition (SVD) and the decomposed image is transformed into a plurality of sub-band images by discrete wavelet transformation (DWT) with a template. A plurality of compensation weight coefficients of DWT are calculated to compensate the sub-band images to generate a plurality of compensated sub-band images which are rebuilt by an inverse DWT. After rebuilding the compensated sub-band images, the output unit is applied to output an enhanced fingerprint image.

18 Claims, 5 Drawing Sheets

(56) References Cited

U.S. PATENT DOCUMENTS

2008/0226124 A1* 9/2008 Seo ................... H04N 1/3217
  382/100
2014/0226879 A1* 8/2014 Westerman ........ G06K 9/00013
  382/125

* cited by examiner

METHOD AND SYSTEM FOR ENHANCING RIDGES OF FINGERPRINT IMAGES

BACKGROUND OF THE INVENTION

1. Field of the Invention

The present invention relates to a fingerprint processing method and system for enhancing ridges of fingerprint images. More particularly, the present invention relates to the fingerprint processing method and system for enhancing ridges of fingerprint images utilizing a combination method of singular value decomposition (SVD) and wavelet transformation.

2. Description of the Related Art

Generally, the Henry Classification System was developed by Sir Edward Henry in British India in the late $19^{th}$ century for sorting fingerprints by patterns, including a right loop, a left loop, a tented arch, a plain arch (i.e. arch) and a whorl. In addition, an eddy pattern and a twin loop pattern (i.e. S-type) are further classified into the pattern of whorls. However, the Henry Classification System is the basis of modern-day classification methods such as ridge flow classification approaches.

Taiwanese Patent Application Publication No. 200641700, entitled "Complete Reflection Type Fingerprint Identification Device," discloses: a device including a main body, a light source, a connection body and an image sensor component. The main body has a finger-pressing zone, a first reflection zone and a light-transparent zone. Light beams from the light source penetrate through the light-transparent zone of the main body to irradiate a finger touch on the finger-pressing area. The connection body has a second reflection zone and the image sensor component is provided on the connection body. Provided between the main body and the connection body is a diaphragm which is a blacked, opaque eyelet diaphragm to filter stray light to form an image on the image sensor component which can capture a fingerprint image with a high degree of contrast and a low degree of noise (i.e., stray light).

Another Taiwanese Patent Publication No. 354397, entitled "Automatic classification method and systematical device for fingerprints," discloses: a classification method and systematical device provided to sort input fingerprints by eights classifications according to numbers of core points and ridge flow directions thereabout. First, an original image of the fingerprint is input and pretreated. A background portion and a fingerprint portion are retrieved from the original image according to means of gray scale and variances. In order to speed up the classification method, only the retrieved fingerprint portion is treated in the following steps. After retrieving the fingerprint portion, a mean directional value is calculated in each block of the fingerprint portion to generate a block directional image. Distributions of the block directional image are utilized to calculate positions of the core points. Finally, the input fingerprints are sort into eights classifications according to their core points and ridge flow directions.

However, there is a need of improving the fingerprint identification device disclosed in Taiwanese Patent Application Publication No. 200641700 and the automatic classification method and the systematical device disclosed in Taiwanese Patent Publication No. 354397 for enhancing ridges of the fingerprint images. The above-mentioned patent publications are incorporated herein by reference for purposes including, but not limited to, indicating the background of the present invention and illustrating the state of the art.

As is described in greater detail below, the present invention intends to provide a fingerprint processing method and a system for enhancing ridges of fingerprint images. An original fingerprint image is decomposed by a singular value decomposition method and a decomposed matrix of the original fingerprint image is transformed into a plurality of sub-band images by a discrete wavelet transformation method based on a Gussian template. The sub-band images are further compensated by a plurality of compensation weigh coefficients for enhancing ridges of fingerprint images in such a way as to mitigate and overcome the above problem.

SUMMARY OF THE INVENTION

The primary objective of this invention is to provide a fingerprint processing method and a system for enhancing ridges of fingerprint images. An original fingerprint image is decomposed by a singular value decomposition method and a decomposed matrix of the original fingerprint image is transformed into a plurality of sub-band images by a discrete wavelet transformation method based on a Gussian template. The sub-band images are further compensated by a plurality of compensation weight coefficients for enhancing ridges of fingerprint images. Accordingly, the method and the system of the present invention are successful in enhancing the accuracy of recognizing the fingerprint images.

The fingerprint processing method for enhancing ridges of fingerprint images in accordance with an aspect of the present invention includes:

decomposing an original fingerprint image by a singular value decomposition method and transforming a decomposed matrix of the fingerprint image to a plurality of sub-band images by a discrete wavelet transformation method with a predetermined template to obtain a plurality of decomposed sub-band images;

calculating a plurality of wavelet-transformed compensation coefficients according to the decomposed sub-band images;

compensating the decomposed sub-band images with the wavelet-transformed compensation coefficients to obtain a plurality of decomposed and compensated sub-band images; and rebuilding the decomposed and compensated sub-band images by an inverse discrete wavelet transformation method to obtain an enhanced fingerprint image.

The fingerprint processing system for enhancing ridges of fingerprint images in accordance with an aspect of the present invention includes:

an input unit connecting with a fingerprint image source to input an original fingerprint image therefrom;

a calculation unit connecting with the input unit, with decomposing an original fingerprint image by a singular value decomposition method, with transforming a decomposed matrix of the fingerprint image into a plurality of sub-band images by a discrete wavelet transformation method with a predetermined template to obtain a plurality of decomposed sub-band images, with calculating a plurality of wavelet-transformed compensation coefficients according to the decomposed sub-band images, with compensating the decomposed sub-band images with the wavelet-transformed compensation coefficients to obtain a plurality of decomposed and compensated sub-band images, with rebuilding the decomposed and compensated sub-band images by an inverse discrete wavelet transformation method to obtain an enhanced fingerprint image; and an output unit connecting with the calculation unit for outputting the enhanced fingerprint image.

In a separate aspect of the present invention, the discrete wavelet transformation method is 2D discrete wavelet transformation.

In a further separate aspect of the present invention, the decomposed matrix of the fingerprint image is transformed into the sub-band images at first level.

In yet a further separate aspect of the present invention, the sub-band images include at least one low-frequency sub-band image, at least one middle-frequency sub-band image and at least one high-frequency sub-band image.

In yet a further separate aspect of the present invention, the wavelet-transformed compensation coefficients are compensation weight coefficients which are calculated by ratios of mean values to a maximum mean value.

In yet a further separate aspect of the present invention, the wavelet-transformed compensation coefficients are positive compensation coefficients.

In yet a further separate aspect of the present invention, the inverse discrete wavelet transformation method is 2D inverse discrete wavelet transformation.

In yet a further separate aspect of the present invention, the predetermined template is a Gaussian template.

In yet a further separate aspect of the present invention, the decomposed matrix of the fingerprint image and the predetermined template are transformed by the discrete wavelet transformation method.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a fingerprint processing method and system for enhancing ridges of fingerprint images in accordance with the preferred embodiment of the present invention can be applicable to various fingerprint recognition devices and related equipment, for example: including various computer-related systems, various security systems, fingerprint collection, classification or recognition systems for crime scene investigation and other fingerprint-related system (e.g. a constellation-predicting system using fingerprint and blood types disclosed in U.S. Pat. No. 8,520,910), which are not limitative of the present invention.

Figure 1:
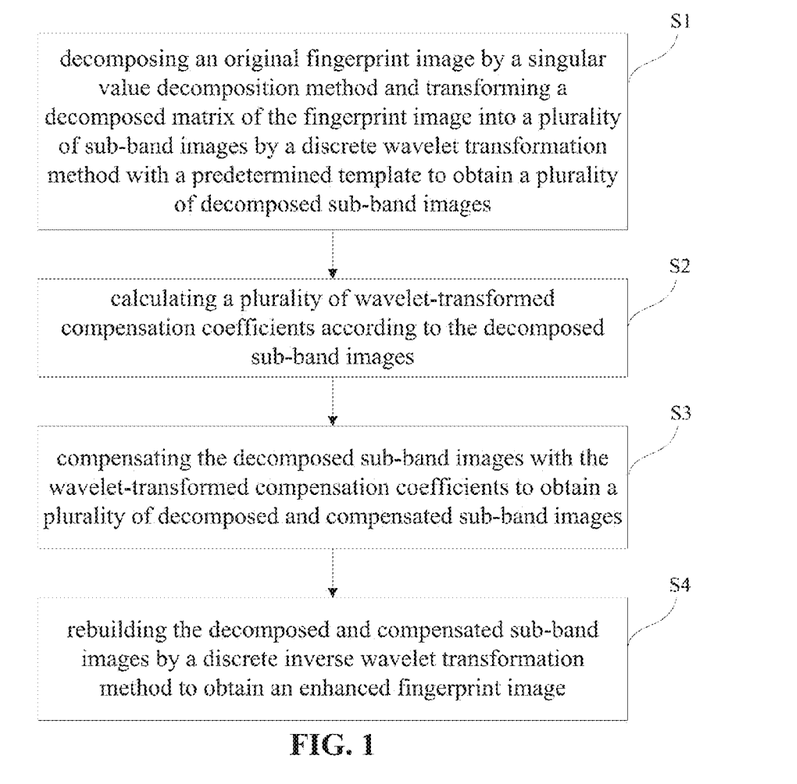
FIG. 1 is a block diagram of a fingerprint processing method for enhancing ridges of fingerprint images in accordance with a preferred embodiment of the present invention.
Figure 2:
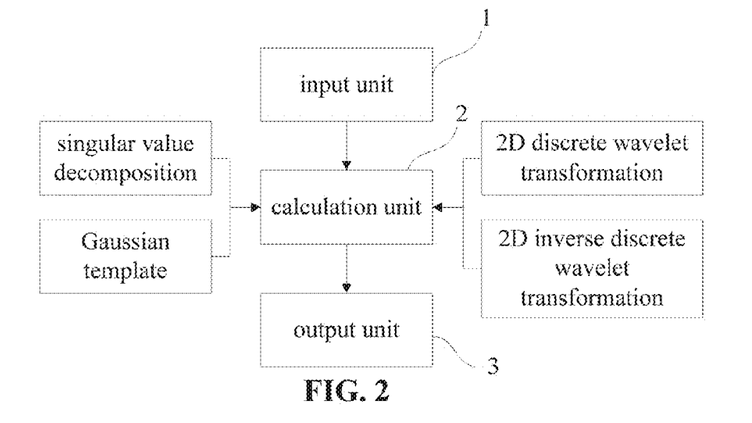
FIG. 2 is a block diagram of a fingerprint processing system for enhancing ridges of fingerprint images in accordance with a preferred embodiment of the present invention.

FIG. 1 shows a block diagram of a fingerprint processing method in accordance with a preferred embodiment of the present invention and FIG. 2 shows a block diagram of a fingerprint processing system in accordance with a preferred embodiment of the present invention suitable for the method shown in FIG. 1. Referring to FIGS. 1 and 2, the fingerprint processing system mainly includes an input unit (e.g. computer-readable data input unit) 1, a calculation unit (e.g. data-processing unit) 2 and an output unit (e.g. computer-readable data output unit) 3 which are suitably connected and arranged in a fingerprint image processing device or the like.

Referring to FIG. 2, the input unit 1 selectively connects with a fingerprint image source (e.g. fingerprint database or fingerprint sensing unit) for retrieving an original fingerprint image therefrom. The calculation unit 2 further connects between the input unit 1 and the output unit 3 and is operated to process the original fingerprint image with a mixture of singular value decomposition and discrete wavelet transformation for generating a fingerprint enhanced image. The output unit 3 also selectively connects with a fingerprint storage unit (e.g. fingerprint database) or a fingerprint recognition unit for supplying the fingerprint enhanced image thereto.

Referring again to FIGS. 1 and 2, the fingerprint processing method of the preferred embodiment of the present invention includes step S1: decomposing the original fingerprint image by a singular value decomposition (SVD) method to obtain a decomposed matrix of the fingerprint image and thus transforming the decomposed matrix of the fingerprint image into a plurality of sub-band images by a discrete wavelet transformation (DWT) method with a predetermined template to obtain a plurality of decomposed sub-band images. In a preferred embodiment, the predetermined template is a Gaussian template and the discrete wavelet transformation method is a 2D discrete wavelet transformation method.

Figure 3A:
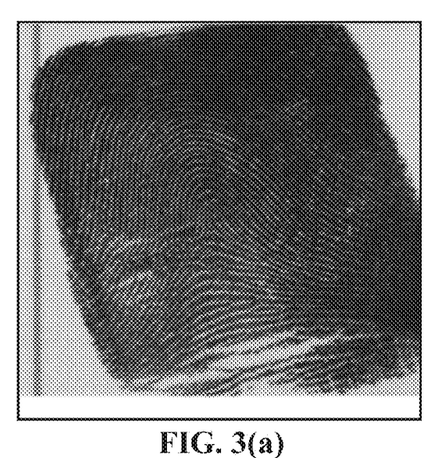
FIG. 3(a) is an original fingerprint image prior to processing with the fingerprint processing method in accordance with the preferred embodiment of the present invention.
Figure 3B:
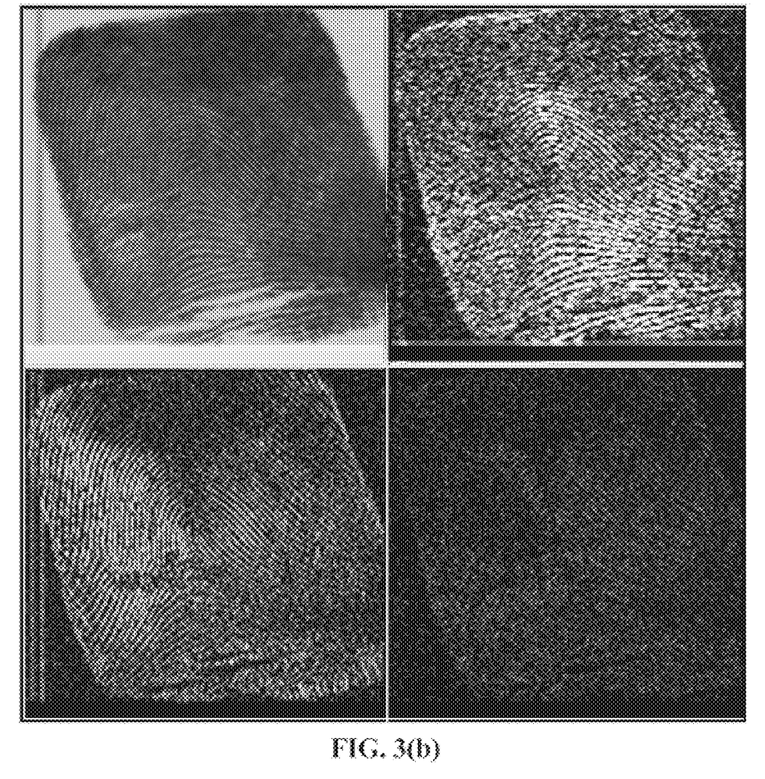
FIG. 3(b) is a series of four sub-band images decomposed and wavelet-transformed by the fingerprint processing method in accordance with the preferred embodiment of the present invention.

By way of example, FIG. 3(a) shows an original fingerprint image prior to processing with the fingerprint processing method in accordance with the preferred embodiment of the present invention. FIG. 3(b) shows a series of four sub-band images generated from the original fingerprint image (shown in FIG. 3(a)) which is decomposed and wavelet-transformed by the fingerprint processing method in accordance with the preferred embodiment of the present invention.

The fingerprint processing method of the present invention utilizes the SVD method to decompose the fingerprint image A to obtain a decomposed component image which has a M×N SVD matrix A with (M≥N), $$A=U\Sigma V^T,$$

wherein $U=[u_1, u_2, \ldots, u_m]$ and $V=[v_1, v_2, \ldots, v_n]$ are orthogonal matrixes, a diagonal of $\Sigma=[D, O]$ includes a plurality of singular values, where D is diag $(\lambda_1, \lambda_2, \ldots, \lambda_k)$ having a non-increasing sequence with the singular values of $\lambda_i, i=1, \ldots, k$, O is a zero matrix (null matrix) of N×(M−N) and $\Sigma$ is intensity information of the fingerprint image.

Next, the M×N SVD matrix of the fingerprint image f is further wavelet-transformed by the 2D DWT method with the Gaussian template Ga. In the first level, four sub-band images of the fingerprint image shall be obtained and LL, HL, LH and HH represent four 2D sub-band matrices. The M×N SVD matrix A is further decomposed to $A=[a_{m,n}]$, wherein A∈{LL, HL, LH, HH} are four decomposed sub-bands, a∈{ll, hl, lh, hh} are wavelet coefficients of sub-bands, and $m=0, 1, \ldots, M/2-1; n=0, 1, 2, \ldots, N/2-1$ are values of wavelet coefficients.

Referring back to FIGS. 1 and 2, the fingerprint processing method of the preferred embodiment of the present invention includes step S2: calculating a plurality of wavelet-transformed compensation coefficients according to the decomposed sub-band images. In a preferred embodiment, the wavelet-transformed compensation coefficients are selected from positive compensation coefficients which are performed as compensation weight coefficients to thereby calculate pre-compensation mean values. A reference value is selected from a maximum mean value of the wavelet-transformed compensation coefficient of the decomposed sub-band image while the mean values of the wavelet-transformed compensation coefficients of the three remained sub-band images are adaptively calculated by ratios of mean values to the maximum mean value. The mean of all of the positive compensation coefficients of each sub-band are calculated by $$\mu_A = \frac{4}{MN} \sum_{m=0}^{M/z-1} \sum_{n=0}^{N/z-1} a_{m,n},$$

where $a_{m,n} \geq 0,$ wherein a maximum value of $\mu_A$ is calculated by $$\mu_{max} = \max_{A \in \{LL, HL, LH, HH\}} \mu_A.$$

The Gaussian template is calculated by $Ga_A = U_{Ga\_A} \Sigma_{Ga\_A} V_{Ga\_A}^T$.

In order to enhance the fingerprint image, each singular value of the sub-band images must be reviewed since the singular values contain plural foreground and intensity information. Generally, the low-frequency sub-band contains most of the dominant information, the middle-frequency sub-bands contain most of the ridge information and the high-frequency sub-band may contain noise The SVD of each matrix of the sub-band coefficients of the fingerprint image with the Gaussian template is calculated by $A = U_A \Sigma_A V_A^T$.

Figure 3C:
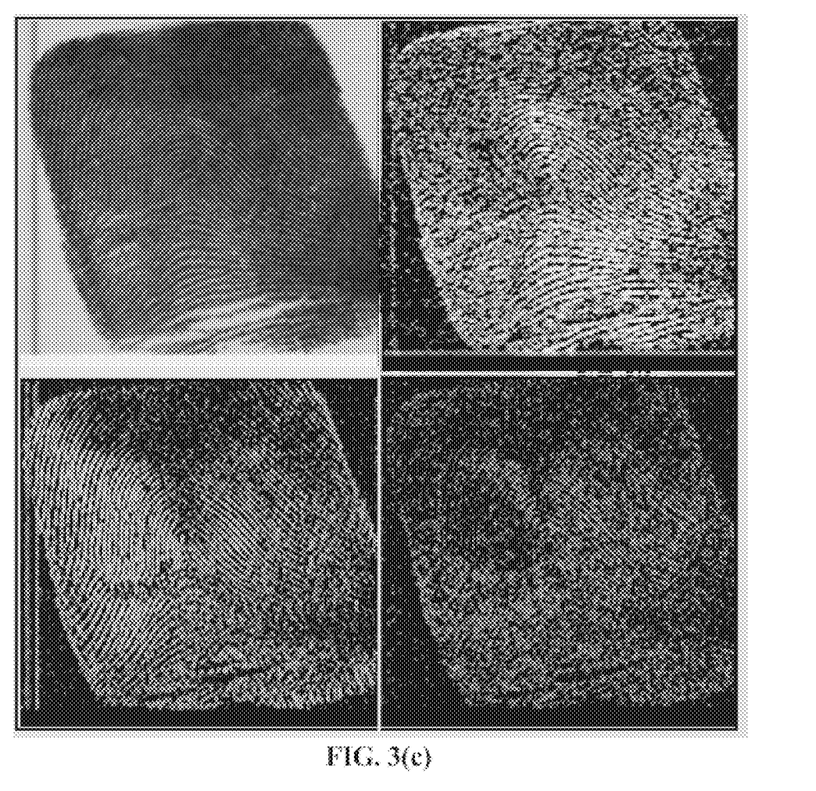
FIG. 3(c) is a series of four compensated fingerprint images processed by the fingerprint processing method in accordance with the preferred embodiment of the present invention.

FIG. 3(c) shows a series of four compensated fingerprint images generated from the four sub-band images (shown in FIG. 3(b)) which are compensated by the fingerprint processing method in accordance with the preferred embodiment of the present invention. Referring to FIGS. 1, 2 and 3(c), the fingerprint processing method of the preferred embodiment of the present invention includes step S3: compensating the decomposed sub-band images with the wavelet-transformed compensation coefficients to obtain a plurality of decomposed and compensated sub-band images, as best shown in FIG. 3(c). In a preferred embodiment, each of the wavelet-transformed compensation weight coefficients for the decomposed sub-band images is calculated by $$\xi_{LL} = \frac{\mu_{max}}{\mu_{LL}} * \frac{\max(\Sigma_{Ga\_LL})}{\max(\Sigma_{LL})}$$

$$\xi_{HL} = \sqrt[6]{\frac{\mu_{max}}{\mu_{HL}} * \frac{\max(\Sigma_{Ga\_HL})}{\max(\Sigma_{HL})}}$$

$$\xi_{LH} = \sqrt[6]{\frac{\mu_{max}}{\mu_{LH}} * \frac{\max(\Sigma_{Ga\_LH})}{\max(\Sigma_{LH})}}$$

$$\xi_{HH} = \sqrt[8]{\frac{\mu_{max}}{\mu_{HH}} * \frac{\max(\Sigma_{Ga\_HH})}{\max(\Sigma_{HH})}}.$$

Accordingly, each matrix of the sub-band coefficients of the fingerprint image multiplied by corresponding wavelet-transformed compensation weight coefficients is calculated as $A = U_A (\xi_A * \Sigma_A) V_A^T$.

Figure 3D:
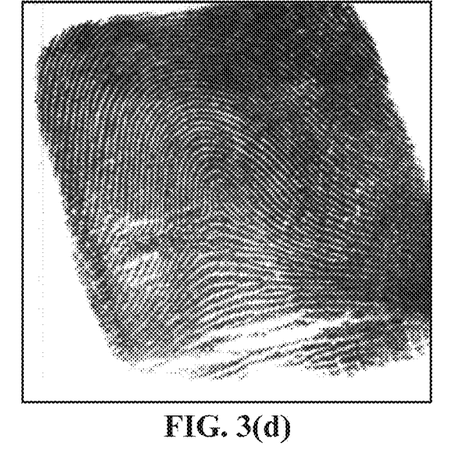
FIG. 3(d) is a rebuilt fingerprint image processed by the fingerprint processing method in accordance with the preferred embodiment of the present invention.

FIG. 3(d) shows a rebuilt fingerprint image generated from the four compensated fingerprint images (shown in FIG. 3(c)) which are recombined by the fingerprint processing method in accordance with the preferred embodiment of the present invention. Referring to FIGS. 1, 2 and 3(d), the fingerprint processing method of the preferred embodiment of the present invention includes step S4: rebuilding the decomposed and compensated sub-band images by an inverse discrete wavelet transformation method to obtain an enhanced fingerprint image, as best shown in FIG. 3(d).

Figure 4A:
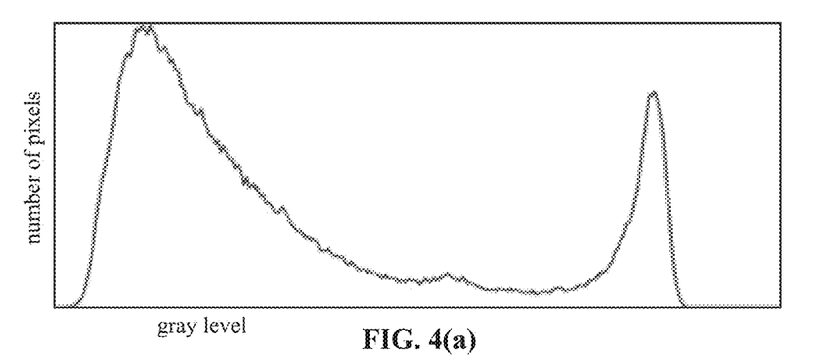
FIGS. 4(a) and 4(b) are schematic diagrams of ridge distribution data of the original fingerprint image and the enhanced fingerprint image processed by the fingerprint processing method in accordance with the preferred embodiment of the present invention.
Figure 4B:
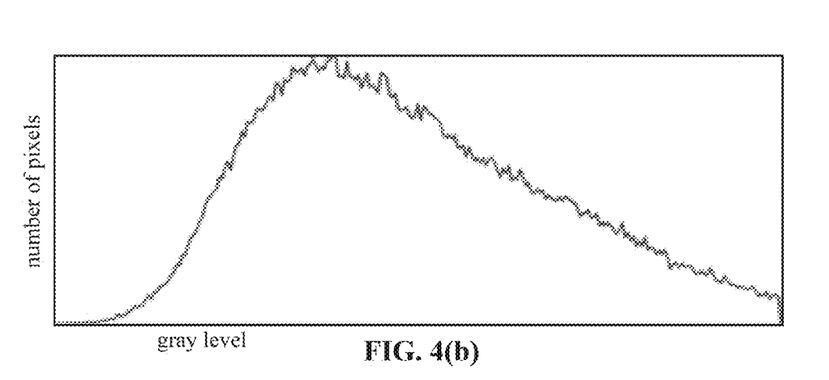

FIGS. 4(a) and 4(b) show schematic diagrams of ridge distribution data (i.e. number of pixels in relation to gray levels) of the original fingerprint image, as shown in FIG. 3(a), and the enhanced fingerprint image, as shown in FIG. 3(d), processed by the fingerprint processing method in accordance with the preferred embodiment of the present invention. Referring now to FIGS. 3(a) and 4(a), the original fingerprint image has two peaks of the ridge distribution data distributed at opposite sides of the diagram. As best shown in FIG. 4(a), the ridge distribution data of the original fingerprint image include information of background and blur regions of the fingerprint image.

Turning now to FIGS. 3(d) and 4(b), the enhanced fingerprint image generated from the original fingerprint image, as shown in FIG. 3(a), processed by the fingerprint processing method of the present invention has a high degree of enhancement. As best shown in FIG. 4(b), the ridge distribution data of the enhanced fingerprint image is a normal distribution concentrated with a single peak and information of background and blur regions of the fingerprint image are removed.

Figure 5:
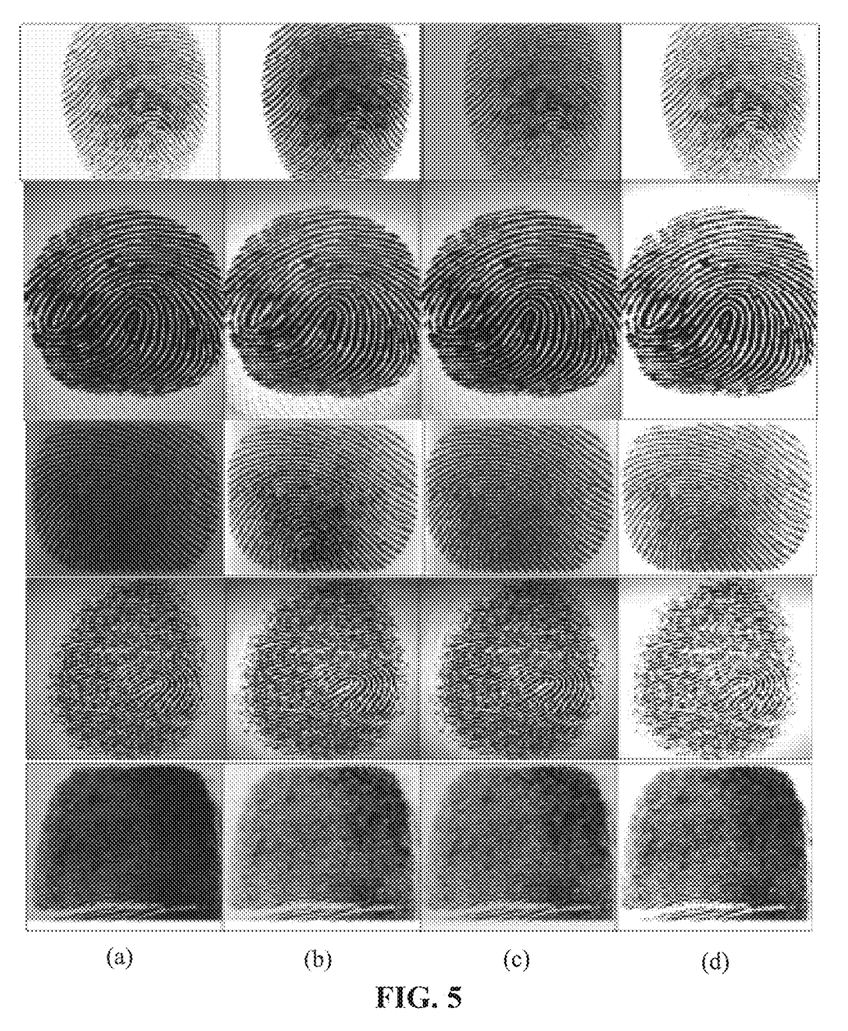
FIG. 5 is a set (a) of five original fingerprint images prior to processing with the fingerprint processing method in accordance with the preferred embodiment of the present invention; a set (b) of five enhanced fingerprint images processed by a method of Histogram Equalization; a set (c) of five enhanced fingerprint images processed by a fingerprint image contrast enhancement method proposed by Bennet & Perumal; and a set (d) of five enhanced fingerprint images processed by the fingerprint processing method in accordance with the preferred embodiment of the present invention.

FIG. 5(a) shows a first set of five original fingerprint images prior to processing with the fingerprint processing method in accordance with the preferred embodiment of the present invention. Referring to FIG. 5(a), first to fourth original fingerprint images are retrieved from the database systems of FVC2002 DB1-A, FVC2002 DB2-A, FVC2002 DB3-A and FVC2002 DB4-A, respectively and the fifth original fingerprint image is retrieved from the database system NIST-4.

FIG. 5(b) shows a second set of five enhanced fingerprint images generated from the original fingerprint images, as shown in FIG. 5(a), which are processed by a method of Histogram Equalization. FIG. 5(c) shows a third set of five enhanced fingerprint images generated from the original fingerprint images, as shown in FIG. 5(a), which are processed by a fingerprint image contrast enhancement method proposed by Bennet & Perumal. FIG. 5(d) shows a fourth set of five enhanced fingerprint images generated from the original fingerprint images, as shown in FIG. 5(a), which are processed by the fingerprint processing method in accordance with the preferred embodiment of the present invention. Referring to FIGS. 5(b), 5(c) and 5(d), the fourth set of five enhanced fingerprint images, as best shown in FIG. 5(d), processed by the fingerprint processing method of the present invention has a quality of contrast much better than those of the second and third sets of the enhanced fingerprint images, as best shown in FIGS. 5(b) and 5(c), processed by the fingerprint processing method of Histogram Equalization and Bennet & Perumal.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A fingerprint processing method comprising:
    decomposing a fingerprint image to obtain a decomposed matrix of the fingerprint image by a singular value decomposition method, with the decomposed matrix having a M×N SVD matrix of the fingerprint image with (M≤N) which is calculated as $A=U\Sigma V^T$, wherein $U=[u_1, u_2, \ldots, u_m]$ and $V=[v_1, v_2, \ldots, v_n]$ are orthogonal matrixes, with a diagonal of $\Sigma=[D,O]$ including a plurality of singular values, where D is diag $(\lambda_1, \lambda_2, \ldots, \lambda_k)$, O is a zero matrix and $\Sigma$ is intensity information of the fingerprint image;
    transforming the M×N SVD matrix of the decomposed matrix of the fingerprint image to a plurality of sub-band images by a discrete wavelet transformation method with a predetermined template to obtain a plurality of decomposed sub-band images, with calculating the M×N SVD matrix with $A=[a_{m,n}]$, wherein $A\in\{LL, HL, LH, HH\}$ are four decomposed sub-bands, $a\in\{ll, hl, lh, hh\}$ are wavelet coefficients of the four decomposed sub-bands, and m=0, 1, ..., M/2−1; n=0, 1, 2, ..., N/2−1 are values of the wavelet coefficients;
    calculating a plurality of wavelet-transformed compensation coefficients according to the plurality of decomposed sub-band images;
    compensating the plurality of decomposed sub-band images with the plurality of wavelet-transformed compensation coefficients to obtain a plurality of decomposed and compensated sub-band images; and
    rebuilding the plurality of decomposed and compensated sub-band images by an inverse discrete wavelet transformation method to obtain an enhanced fingerprint image.

2. The fingerprint processing method as defined in claim 1, wherein transforming comprises transforming the decomposed matrix of the fingerprint image by a 2D discrete wavelet transformation.

3. The fingerprint processing method as defined in claim 1, wherein transforming to obtain the plurality of sub-band images is at a first level.

4. The fingerprint processing method as defined in claim 1, wherein the plurality of sub-band images includes at least one low-frequency sub-band image, at least one middle-frequency sub-band image and at least one high-frequency sub-band image.

5. The fingerprint processing method as defined in claim 1, wherein the wavelet-transformed compensation coefficients are compensation weight coefficients.

6. The fingerprint processing method as defined in claim 5, further comprising calculating the compensation weight coefficients by ratios of mean values to a maximum mean value.

7. The fingerprint processing method as defined in claim 1, wherein the wavelet-transformed compensation coefficients are positive compensation coefficients.

8. The fingerprint processing method as defined in claim 1, wherein rebuilding comprises rebuilding the plurality of decomposed and compensated sub-band images by a 2D inverse discrete wavelet transformation.

9. The fingerprint processing method as defined in claim 1, wherein the predetermined template is a Gaussian template.

10. A fingerprint processing system comprising:
    an input unit connecting with a fingerprint image source to input a fingerprint image therefrom;
    a calculation unit connecting with the input unit and decomposing the fingerprint image to obtain a decomposed matrix of the fingerprint image by a singular value decomposition method, with the decomposed matrix of the fingerprint having a M×N SVD matrix with (M≥N) which is calculated as $A=U\Sigma V^T$, wherein $U=[u_1, u_2, \ldots, u_m]$ and $V=[v_1, v_2, \ldots, v_n]$ are orthogonal matrixes, with a diagonal of $\Sigma=[D, O]$ including a plurality of singular values, where D is diag $(\lambda_1, \lambda_2, \ldots, \lambda_k)$, O is a zero matrix and $\Sigma$ is intensity information of the fingerprint image, with the M×N SVD matrix of the decomposed matrix of the fingerprint image transformed into a plurality of sub-band images by a discrete wavelet transformation method with a predetermined template to obtain a plurality of decomposed sub-band images, with the M×N SVD matrix calculated with $A=[a_{m,n}]$ wherein $A\in\{LL, HL, LH, HH\}$ are four decomposed sub-bands, $a\in\{ll, hl, lh, hh\}$ are wavelet coefficients of the four decomposed sub-bands, and m=0, 1, ..., M/2−1; n=0, 1, 2, ..., N/2−1 are values of the wavelet coefficients, with a plurality of wavelet-transformed compensation coefficients calculated according to the plurality of decomposed sub-band images, with the decomposed sub-band images compensated with the plurality of wavelet-transformed compensation coefficients to obtain a plurality of decomposed and compensated sub-band images, with the plurality of decomposed and compensated sub-band images rebuilt by an inverse discrete wavelet transformation method to obtain an enhanced fingerprint image; and an output unit connecting with the calculation unit for outputting the enhanced fingerprint image.

11. The fingerprint processing system as defined in claim 10, wherein the discrete wavelet transformation method is a 2D discrete wavelet transformation.

12. The fingerprint processing system as defined in claim 10, wherein the decomposed matrix of the fingerprint image is transformed into the plurality of sub-band images at a first level.

13. The fingerprint processing system as defined in claim 10, wherein the plurality of sub-band images includes at least one low-frequency sub-band image, at least one middle-frequency sub-band image and at least one high-frequency sub-band image.

14. The fingerprint processing system as defined in claim 10, wherein the wavelet-transformed compensation coefficients are compensation weight coefficients.

15. The fingerprint processing system as defined in claim 14, wherein the compensation weight coefficients are calculated by ratios of mean values to a maximum mean value.

16. The fingerprint processing system as defined in claim 10, wherein the wavelet-transformed compensation coefficients are positive compensation coefficients.

17. The fingerprint processing system as defined in claim 10, wherein the inverse discrete wavelet transformation method is a 2D inverse discrete wavelet transformation.

18. The fingerprint processing system as defined in claim 10, wherein the predetermined template is a Gaussian template.

* * * * *